United States Patent Office 3,436,117
Patented Apr. 1, 1969

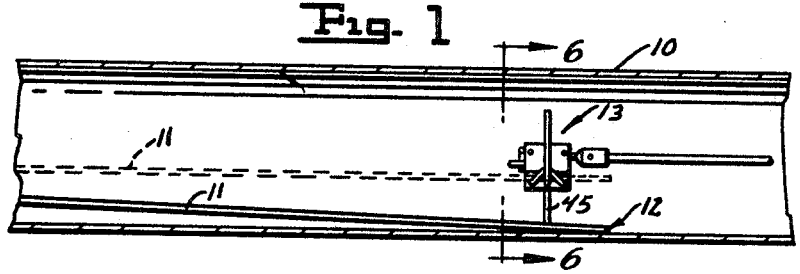
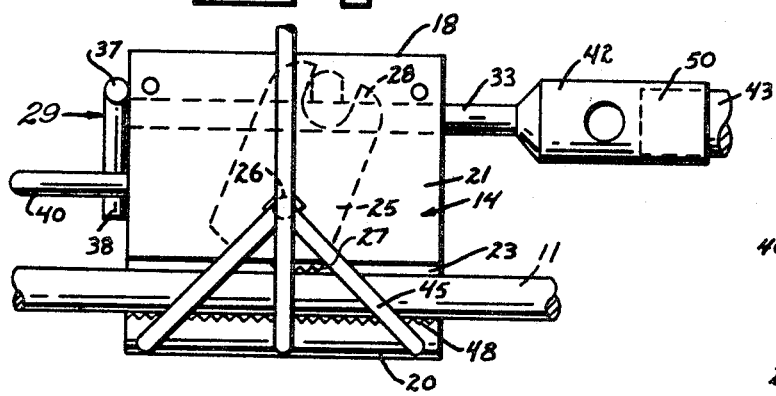
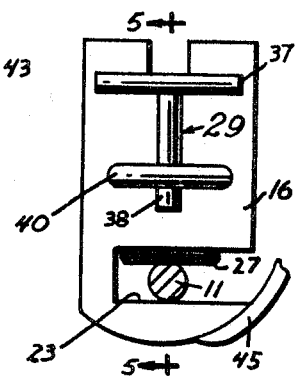
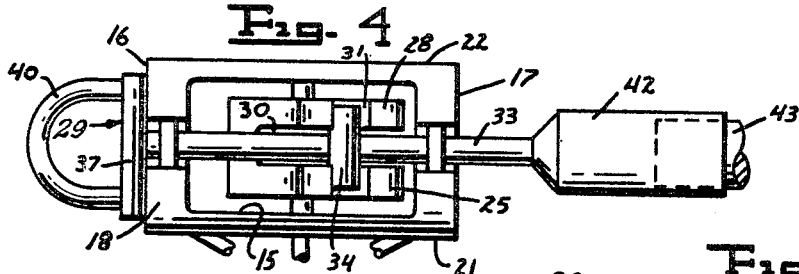
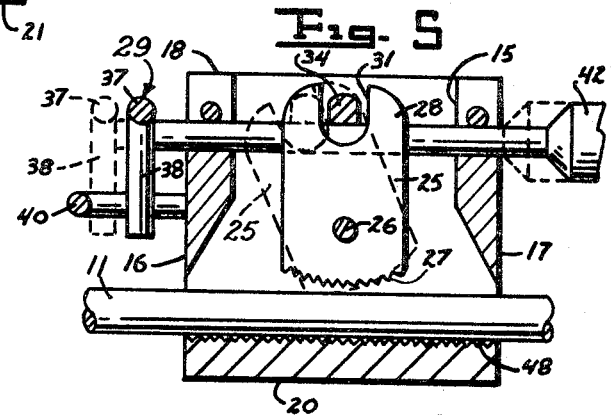
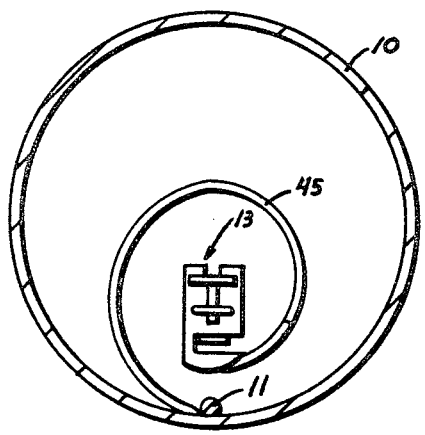
INVENTOR.
CHESTER A. TRUMAN
BY
Wells & St. John
ATTYS.

3,436,117
ROD RETRIEVAL TOOL
Chester A. Truman, 2528 Garland Ave., W.,
Spokane, Wash. 99205
Filed July 13, 1967, Ser. No. 653,074
Int. Cl. E21c *19/02;* E21b *31/00*
U.S. Cl. 294—104                                 4 Claims

ABSTRACT OF THE DISCLOSURE

A tool for recovering broken lengths of flexible unjointed rod from a pipeline including a spiral guide to direct the length of rod into a throat formed within a grooved housing. The housing is rotated, pushed or pulled to recover the rod length. A pivoted jaw is adapted to engage the rod and move it along the pipe. The jaw mechanism serves both to grip the rod and to impart movement to the tool.

Background of the invention

This invention relates to a tool for retrieving broken rods in pipelines such as sewer lines.

It is becoming common practice to utilize continuous unjointed flexible rods in operating underground cleaning tools for the unblocking of sewer lines. Often augers, corkscrews, root saws and other implements are pulled or pushed along the inside of the sewer line to engage and receive debris or obstructions in the line. Such implements are capable of being pushed and pulled in the sewer line between adjacent manholes for clearing obstructions in the sewer line.

Infrequently, the flexible rod that moves the pipeline implement such as a corkscrew or root saw is broken off in the sewer line. It is necessary to retrieve the rod and cleaning device so that the pipeline may be effectively utilized. The loss of a cleaning device results in the obstruction of the line and considerable loss to the owner if it is not recovered.

One of the principal objects of this invention is to provide a retrieving tool capable of being positioned within a sewer line for attachment to a broken constant diameter rod in such a manner that the broken portion of the rod may be either pushed or pulled along the sewer line to an adjacent manhole for recovery of the broken rod and the implement to which it is attached. The lengths of broken rod are continuous and present no abutments to facilitate recovery.

A further object of this invention is to provide a retrieval tool that may be used in different diameter sewer lines for retrieving broken rods.

A further object of this invention is to provide a retrieval tool that is simple to construct and economical to manufacture for readily and easily being able to grasp a broken unjointed rod with a minimum of effort.

An additional object of this invention is to provide a retrievable tool and guide means for guiding the broken rod to the jaws of the tool as the tool is rotated.

These and other objects of this invention will become apparent upon reading the following description of a preferred embodiment of this invention.

Brief description of the drawings

A preferred embodiment of this invention is illustrated in the accompanying drawings, in which:

FIG. 1 is a cross sectional view of a sewer line showing a rod retrieval tool positioned therein for retrieving a broken rod;

FIG. 2 is an enlarged side elevation view of the rod retrieval tool;

FIG. 3 is a front view of the tool;

FIG. 4 is a plan view of the tool;

FIG. 5 is a cross sectional view of the tool taken along line 5—5 in FIG. 3; and FIG. 6 is a cross sectional view taken along line 6—6 in FIG. 1 particularly emphasizing the operation of the retrieval tool with a spiral guide thereon.

Description of the preferred embodiment

There is shown in FIG. 1 a pipe 10 that contains a section 11 of a long unjointed rod that is broken from the rest of the rod at point 12. A retrieval tool 13 is shown positioned within the sewer line to engage the broken rod section. Subsequently tool 13 will either pull or push the rod down the pipeline to an adjacent manhole or outlet. Normally lines such as in a sewer are in a substantially horizontal orientation so that the retrieval tool moves along the lower segment of the pipeline as is shown in FIG. 6.

The retrieval tool is generally designated by the numeral 13 and has a hollow housing 14 forming a substantially enclosed cavity 15 defined by the end walls 16 and 17, top and bottom walls 18 and 20 and side walls 21 and 22.

A longitudinal groove 23 is formed in the housing 14 for receiving the broken rod therein. The longitudinal groove 23 extends through the side wall 21 and a portion of the end wall 16 and 17 in communication with the cavity 15.

A gripping block or jaw 25 is pivotally mounted within the cavity 15 about a pivot post 26 extending between the side walls 21 and 22. The gripping block 25 has one end 27 extending to the longitudinal groove 23. The end surface at 27 is serrated to better grip the smooth rod surface. It is of such a length that when the block is in the neutral position or perpendicular to a length of broken rod within the groove 23 the surface 27 does not engage the rod section 11. The surface configuration along surface 27 is longitudinally symmetrical at both sides of post 26 so that when the block 25 is pivoted in either direction by a pushing or pulling force one of the corners of the end 27 will engage the broken rod section to hold the section 11 in the longitudinal groove 23. The surface 48 of groove 23 opposite to the end surface 27 of jaw 25 is also serrated to facilitate gripping of the smooth rod surfaces FIG. 5).

The other end 28 of the gripping block 25 extends towards the top wall 18. The end 28 has formed therein an intersecting longitudinal slot 30 and transverse slot 31.

A control rod 33 that is parallel with the groove 23 and offset from the pivot post 26 extends through the housing 14 (including the end walls 16 and 17). Control rod 33 is located within the longitudinal slot 30 of the gripping bar. A cross bar 34 is affixed to the control rod and extends from the control rod into the transverse slot 31. As control rod 33 is moved with respect to the housing 14 the cross bar 34 engages the end 28 of the gripping block 25 to pivot the block about the pivot post 26.

A stop means operably connected between the housing 14 and the control rod 33 is provided for limiting the axial movement of the control rod relative to housing 14. The stop means includes a T-shaped member 29 perpendicularly mounted on the outer end of the control rod 33 as it extends through the front wall 16. The stop means also has a U-shaped bracket 40 that is mounted to the front wall 16. The T-shaped member 29 has a cross leg 37 and a downwardly projecting leg 38 so that when the control rod is pushed (moved to the left in FIG. 2) the leg 38 will stop when it engages the U-shaped bracket 40 to limit the forward movement of the control board 33. When rod 33 is pulled, the abutment of the cross leg 37 against the end of housing 14 limits such relative motion.

The other end of the control rod 33 has an enlarged section 42 that is connectable to a retrievable rod 43 that extends along the sewer to an outlet where it is connected to power equipment capable of moving the tool along the inside of the sewer line for recovering a rod section 11.

To facilitate the registration of the broken rod section 11 within the longitudinal jaw groove 23, a spiral guide 45 is mounted to the housing 24 to bring the rod section into groove 23 as the retrieval tool is rotated. This may be particularly seen in FIG. 6 in which the broken rod section is shown at the bottom of the sewer pipe 10.

During the retrieval operation, a retrieval tool 13 is connected to the end of a retrieval rod 43 by a suitable coupling member 50 and is axially moved along the sewer pipe 12 to a position over the broken rod section 11. The broken end of the rod 11 may be accurately located by measuring the length of the rod section retrieved from the sewer. Thus it is not difficult to calculate the distance that the retrieval tool 11 must be moved axially along the sewer pipe before it is positioned over the broken section that remains in the sewer pipe. After the retrieval tool is positioned over the broken section, the retrieval cable tension on rod 43 is relaxed to place jaw 25 in a neutral condition and the retrieval tool is rotated so that the spiral guide 45 moves under the broken rod section 11 as is shown in FIG. 6 to move the rod 11 radially into the jaw groove 23.

While the retrieval tool is being rotated the gripping block 25 is positioned in the neutral position so that the broken rod section can readily move into the longitudinal groove 23. After the retrieval tool has been rotated sufficiently to remove the broken rod section from the bottom of the sewer pipe into the longitudinal groove 23, the retrieval rod is moved longitudinally to pivot the gripping block from the neutral position to one of the gripping positions. If the operator desires to push the broken rod along the sewer line (to the left as shown in FIG.1) the operator pushes the retrieval rod 43 to move the control rod 33 to the left as is shown by dotted lines in FIG. 5 to grip the broken rod section 11 securely in the longitudinal groove 23. Further pushing movement of the rod 43 moves the retrieval tool and the broken rod section along the sewer pipe 10. If the operator desires to pull the broken rod section 11 along the sewer pipe, the operator pulls the retrieval rod (moves the rod to the right as is shown in FIG. 2) to pivot the gripping block 25 clockwise as shown by dotted lines in FIG. 2 to securely grip the broken rod section in the longitudinal groove 23. Further pulling movement of the retrieval rod 43 causes the retrieval tool and the broken rod section to be pulled along the sewer pipe, the movement of housing 14 being imparted from rod 33 through the cross bar 34.

It should be appreciated that the entire manipulation of the retrieval tool is accomplished through the rod 43. After the retrieval tool is positioned over the broken rod section the tool is merely rotated by the rod to position the broken section of rod within the groove. To lock the broken rod section to the housing 14 the retrieval rod 43 is moved axially in either direction as desired.

What I claim is:

1. A retrieval tool for grasping broken sewer rods to permit the pushing or pulling of the broken rod from the sewer, said retrieval tool comprising:
    (a) a tool housing having a longitudinal groove formed therein for receiving the broken rod;
    (b) gripping block means pivotally mounted to the housing about a transverse pivotal axis and having a longitudinal gripping edge symmetrical at both sides of its pivotal axis and communicating with the groove for permitting movement of the rod in the groove when said gripping block means is in a central neutral position and for gripping the rod in the groove when said gripping block means is pivoted in either diertcion from the neutral position; and
    (c) control rod means slidably mounted in the housing operatively connected to said gripping block means for pivoting the gripping block means from the neutral position about its pivotal axis when pulling or pushing force is applied to said control rod means.

2. The retrieval tool as defined in claim 1 further comprising:
    stop means operatively connected between said housing and control rod means for limiting movement of the control rod means relative to said housing when pushing or pulling forces are applied thereto.

3. A retrieval tool as defined in claim 1 wherein said gripping block means comprises a solid gripping block having interconnecting longitudinal and transverse slots formed therein spaced from its pivotal axis, wherein the control rod extends through the longitudinal slot and wherein a transverse bar is affixed to the control rod extending into the transverse slot to engage and pivot the gripping block when the control rod is axially moved.

4. The retrieval tool as defined in claim 2 wherein the stop means includes a leg member formed on the end of said control rod means and a U-shaped bracket mounted to the side of the housing for receiving the radial leg to permit limited axial movement of said control rod means relative to the housing.

References Cited
UNITED STATES PATENTS

| | | | |
|---|---|---|---|
| 1,015,198 | 1/1912 | Long et al. | 294—86.1 |
| 1,460,320 | 6/1923 | Frey | 294—104 |

RICHARD E. AEGERTER, *Primary Examiner.*

U.S. Cl. X.R.

294—86.1